Figure 5:
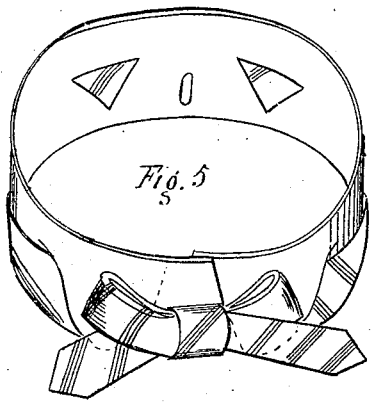
Figure 6:
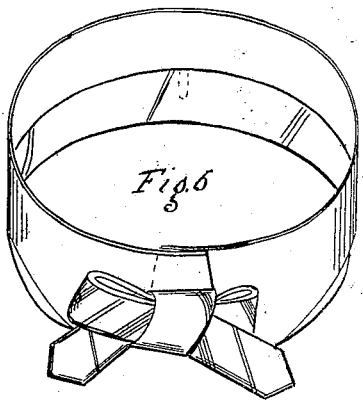

C. W. Saladee,
Collar.

No. 87,116.   Patented Feb 23, 1869.

2 Sheets, Sheet 1

Witnesses:
V. C. Clayton

Inventor:
Cyrus W. Saladee
by atty
W. C. Clayton & Co.

C. W. Saladee,
Collar,
No. 87,116. Patented Feb. 23, 1869.
2 Sheets, Sheet 2
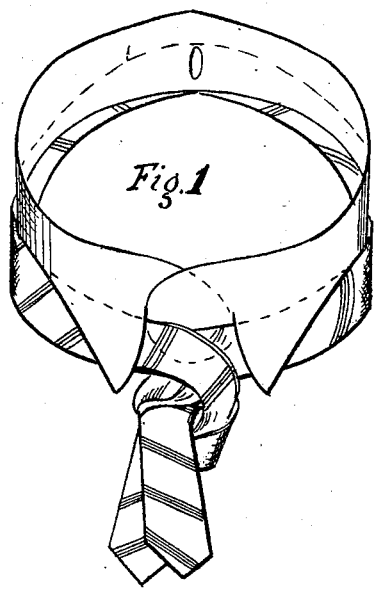
Fig. 1
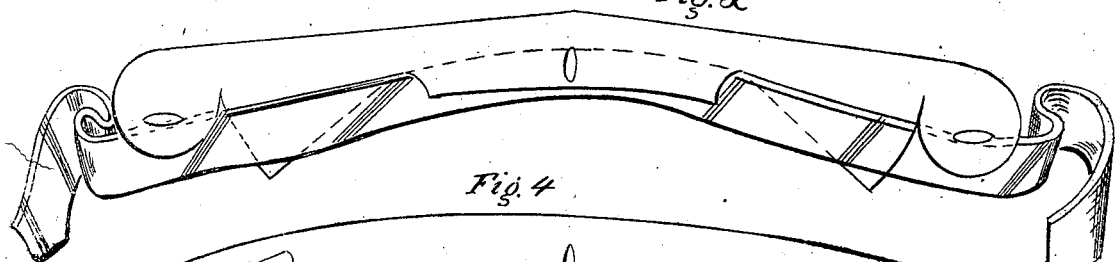
Fig. 2
Fig. 4
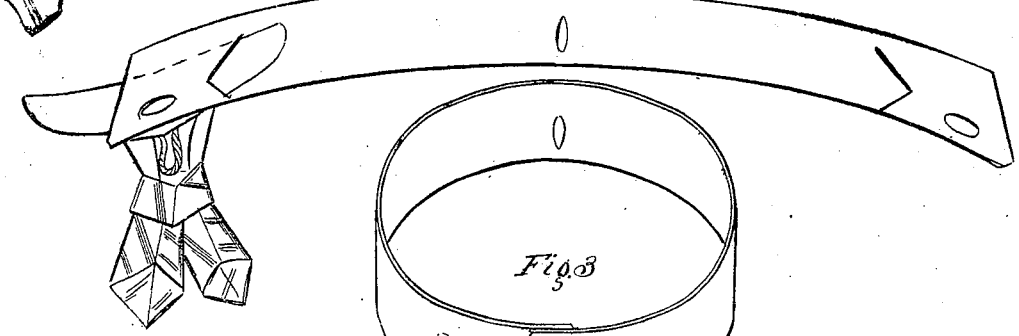
Fig. 3
Witnesses:
V. C. Clayton
J. G. Clayton
Inventer:
Cyrus W. Saladee
by attys
Jo. C. Clayton & Co.

CYRUS W. SALADEE, OF CIRCLEVILLE, OHIO.

Letters Patent No. 87,116, dated February 23, 1869.

IMPROVEMENT IN COLLARS.

The Schedule referred to in these Letters Patent and making part of the same.

*To all whom it may concern:*

Be it known that I, CYRUS W. SALADEE, of Circleville, in the State of Ohio, have invented a new and improved Mode of Making Paper Collars; and I hereby declare that the following is a full and exact description thereof, reference being had to the accompanying drawings, and to the letters of reference marked thereon.

My invention has reference only to that class of collars denominated "standing collars," and, by its application, I acquire the double advantage of imparting to the standing collar the appearance of any of the approved styles of "turn-down collar," and which device also secures the neck-tie or cravat in its proper position.

I attain this object by the peculiar shape of the perforations in the sides of the collar.

I am aware that slits and perforations have been made in both "standing" and "turn down" collars, for the purpose of holding the neck-tie or cravat in position, and to which I make no claim, as that is old and well known; but what I do contend for as absolutely novel in my invention is, viz, perforating the sides of standing collars in such shape and manner as that, when the cravat is in position, it shall have the appearance of a "turn-down" collar.

I thus combine, in a very simple manner, the advantages of both the "standing" and "turn-down" collars in the "standing" collar, and which is done at about one-half the cost in material as used in the present method of making the ordinary styles of "turn-down" collars.

In the drawings—

Figure 1 represents a standing collar, with the cravat in position, and in imitation of the "Shakspeare" style of turn-down collar; and Figure 2 is the same collar straightened out, with the cravat in position, and which shows the shape of the lower edge of the collar, and how the points A A are formed, to give the collar, when in position, the appearance of the "turn-down" style.

I will here state that the points A A may be cut in any shape the fancy may dictate, or may be cut in imitation of any of the present styles of "turn-down" collars.

Figure 9:
Figure 10:
Figure 7:
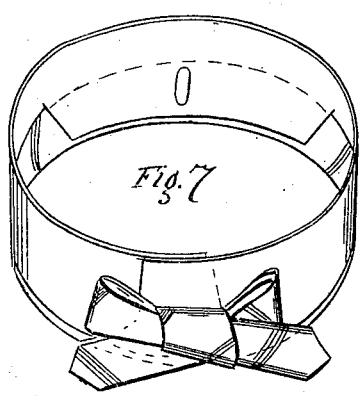
Figure 8:
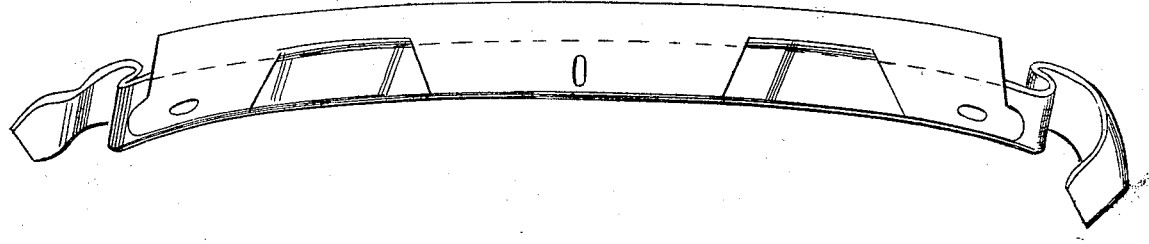

Figure 5 is another modification of my invention, and in imitation of the "turn-down" style; but in this case the points A A are formed by the perforations I I through the sides of the collar, as seen in Figure 9; and through the back of this collar, fig. 5, are perforations B B, and the points thus made are used to prevent the cravat from working up on the back of the neck.

Fig. 5 also shows how the cravat is adjusted when the collar is in position.

These points A can be made any shape, in imitation of the "turn-down" collar, by the shape of the perforations I I.

I intend so moulding or stamping the points A made by the perforations I I, fig. 9, that they shall flare out from the main body of the collar when in position on the neck, and thus more completely imitate a turn-down collar; and, in the process of moulding or stamping these points, they may receive an impression of any fanciful design, printed or embossed thereon.

The other figures in the drawings represent other modifications not necessary to be particularly described in this connection.

Claim.

What I claim as new of my invention, and desire to secure by Letters Patent, is—

Perforating the sides of standing collars, in such shape and manner as that, when the cravat is in position, it shall have the appearance of a "turn-down collar," substantially as shown and described.

In testimony that I claim the above, I hereunto subscribe my name on this, the 4th day of November, 1868.

CYRUS W. SALADEE.

Witnesses:
  C. S. BITZER,
  E. A. SALADEE.